(12) United States Patent
Chaudhuri et al.

(10) Patent No.: US 10,142,019 B2
(45) Date of Patent: Nov. 27, 2018

(54) END USER DEVICE AND ASSOCIATED METHOD FOR SELECTING VISIBLE LIGHT COMMUNICATION PERSONAL AREA NETWORK COORDINATOR

(71) Applicant: Wipro Limited, Bangalore (IN)

(72) Inventors: Saptarshi Chaudhuri, Bangalore (IN); Avijit Manna, Kolkata (IN)

(73) Assignee: WIPRO LIMITED, Bangalore (IN)

( * ) Notice: Subject to any disclaimer, the term of this patent is extended or adjusted under 35 U.S.C. 154(b) by 71 days.

(21) Appl. No.: 15/372,753

(22) Filed: Dec. 8, 2016

(65) Prior Publication Data

US 2018/0123690 A1 May 3, 2018

(30) Foreign Application Priority Data

Oct. 30, 2016 (IN) .............................. 201641037193

(51) Int. Cl.
*H04B 10/00* (2013.01)
*H04B 10/116* (2013.01)
*H04W 4/80* (2018.01)

(52) U.S. Cl.
CPC ............ *H04B 10/116* (2013.01); *H04W 4/80* (2018.02)

(58) Field of Classification Search
CPC ......... H04B 10/116; H04N 4/80; H04N 4/008
USPC ........................................................ 398/118
See application file for complete search history.

(56) References Cited

U.S. PATENT DOCUMENTS

| | | | |
|---|---|---|---|
| 9,882,640 B1 * | 1/2018 | Chaudhuri | H04B 10/116 |
| 2015/0319639 A1 | 11/2015 | Poola et al. | |
| 2016/0277161 A1 | 9/2016 | Haque et al. | |
| 2017/0047994 A1 * | 2/2017 | Logvinov | H04B 10/116 |
| 2017/0163340 A1 * | 6/2017 | Poola | H04B 10/116 |
| 2017/0207851 A1 * | 7/2017 | Zeng | H04B 10/116 |

OTHER PUBLICATIONS

Anurag Sarkar et al., "Li-Fi Technology: Data Transmission through Visible Light", *IJARCSMS*, vol. 3, Issue 6; Jun. 2015. pp. 1-12.

* cited by examiner

*Primary Examiner* — Tesfaldet Bocure
(74) *Attorney, Agent, or Firm* — Finnegan, Henderson, Farabow, Garrett & Dunner, LLP

(57) ABSTRACT

An End User Device (EUD) and an associated method for selecting Visible light communication Personal Area Network Coordinators (VPANCs) is disclosed. The method includes receiving, by the EUD, a set of customized channel scan parameters and a VPANC selection policy from a current VPANC the EUD is associated with, wherein the set of customized channel scan parameters and the VPANC selection policy are created by the current VPANC; assessing, by the EUD, quality of an active channel currently used by the EUD, wherein the active channel is associated with the current VPANC; and switching, by the EUD, to a new VPANC from a plurality of VPANCs based on the set of customized channel scan parameters and the VPANC selection policy in response to the assessing, wherein the plurality of VPANCs comprise the current VPANC.

19 Claims, 8 Drawing Sheets

END USER DEVICE AND ASSOCIATED METHOD FOR SELECTING VISIBLE LIGHT COMMUNICATION PERSONAL AREA NETWORK COORDINATOR

TECHNICAL FIELD

This disclosure relates generally to Light Fidelity (Li-Fi) networks and more particularly to an End User Device (EUD) and associated method for selecting Visible light communication Personal Area Network Coordinator (VPANC).

BACKGROUND

As the number of users of existing wireless communication technologies (for example, Wi-Fi) are increasing, availability of radio spectrum has become a challenge. Deployment of these new age wireless technologies also consume massive energy, which is a threat to the environment. Moreover, these technologies are not suitable under certain conditions (for example, under water or within airplanes).

Some of the above discussed problems are solved by Light-Fidelity (Li-Fi) technology, which is a wireless technology that proposes use of visible light as a media for data transfer and communication. However, existing techniques providing Visible Light Communication (VLC) in Li-Fi network suffer from many drawbacks that include, delay in channel scan, unnecessary power consumption by an End User Device (EUD) due to wrong channel scan, unsuitable selection of a VLC Personal Area Network Coordinator (VPANC), incomplete channel scan for the EUD in case of shorter channel scan duration, increased power consumption in the EUD in case of longer channel scan duration, selection of an unsuitable VPAN having poor quality channel that will affect throughput for an end user, limited mobility within the VPAN, and drop in connection due to dead zones between two VPANs.

There is therefore a need for a mechanism that provides suitable VPAN selection and quality of coverage in terms of connection and throughput for EUD mobility across VPNs.

SUMMARY

In one embodiment, a method for selecting Visible light communication Personal Area Network Coordinators (VPANCs) is disclosed. The method includes receiving, by an End User Device (EUD), a set of customized channel scan parameters and a VPANC selection policy from a current VPANC the EUD is associated with, wherein the set of customized channel scan parameters and the VPANC selection policy are created by the current VPANC; assessing, by the EUD, quality of an active channel currently used by the EUD, wherein the active channel is associated with the current VPANC; and switching, by the EUD, to a new VPANC from a plurality of VPANCs based on the set of customized channel scan parameters and the VPANC selection policy in response to the assessing, wherein the plurality of VPANCs comprise the current VPANC.

In another embodiment, an EUD in a Light Fidelity (Li-Fi) network is disclosed. The EUD includes: a network interface communicatively coupled to a current VPANC; a processor; and a memory communicatively coupled to the processor, wherein the memory stores processor instructions, which, on execution, causes the processor to: receive a set of customized channel scan parameters and a VPANC selection policy from the current VPANC the EUD is associated with, wherein the set of customized channel scan parameters and the VPANC selection policy are created by the current VPANC; assess quality of an active channel currently used by the EUD wherein the active channel is associated with the current VPANC; and switch to a new VPANC from a plurality of VPANCs based on the set of customized channel scan parameters and the VPANC selection policy hi response to the assessing, wherein the plurality of VPANCs comprise the current VPANC.

In yet another embodiment, a non-transitory computer-readable storage medium having stored thereon, a set of computer-executable instructions for selecting VPANCs, causing a computer comprising one or more processors to perform steps comprising: receiving a set of customized channel scan parameters and a VPANC selection policy from a current VPANC an EUD is associated with, wherein the set of customized channel scan parameters and the VPANC selection policy are created by the current VPANC; assessing quality of an active channel currently used by the EUD, wherein the active channel is associated with the current VPANC; and switching the EUD to a new VPANC from a plurality of VPANCs based on the set of customized channel scan parameters and the VPANC selection policy in response to the assessing, wherein the plurality of VPANCs comprise the current VPANC It is to be understood that both the foregoing general description and the following detailed description are exemplary and explanatory only and are not restrictive of the invention, as claimed:

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
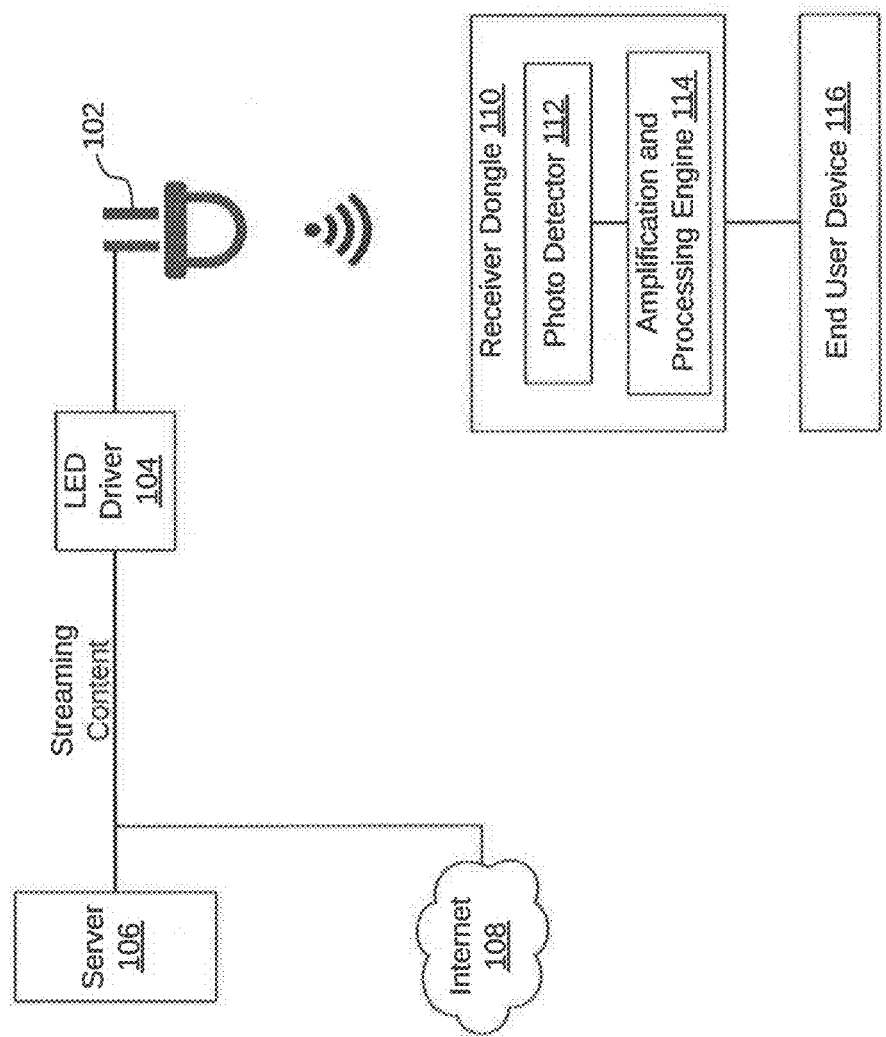
FIG. 1 illustrates a block diagram of an exemplary Light Fidelity (Li-Fi) network in which various embodiment may function.

Additional illustrative embodiments are listed below. In one embodiment, a block diagram of a Light Fidelity (Li-Fi) network 100 (that is exemplary) is illustrated in FIG. 1, in which various embodiment may function. Li-Fi network 100 includes a plurality of Light Emitting Diodes (LED) lamps (for example, LED lamp 102) that is controlled by an LED driver 104. LED driver 104 turns LED lamp 102 'ON' to transmit a digital 1 and turns LED lamp 102 'OFF' to transmit a digital 0. LED lamp 102 is rapidly turned 'ON' and 'OFF' to transmit data, which may be streamed from a server 106 and/or the Internet 108. The streamed data is passed though LED driver 104, which varies the rate at which LED lamp 102 is flickered in order to encode and transmit the streamed data. It will be apparent to a person skilled in the art that multiple such LED lamps may be used to encode and transmit data. It will be further apparent to a person skilled in the art that combination of different color LED lamps (for example, red, green, and blue) may be used to alter frequency of light, such that each frequency encodes a different data channel.

The encoded data transmitted by LED lamp 102 is received by a receiver dangle 110 that includes a photo detector 112 and an amplification and processing engine 114. Photo detector 112 is a light sensitive device that decodes the flickering rate of LED lamp 102 and converts it back to the streamed data for consumption by an End User Device (EUD) 116. After conversion though, amplification and processing engine 114 further processes and amplifies the streamed data in order to share it with EUD 116. It will be apparent to a person skilled in the art that multiple EUDs may be in communication with receiver dangle 110. Examples of EUD 116 may include, but are not limited to a smartphone, a laptop, a tablet, a phablet, a computer, a gaming console, a set-top box, and an Internet of Things (IoT) enabled smart device that has wireless connectivity. It will also be apparent to a person skilled in the art that receiver dangle 110 may be a part of EUD 116.

Figure 2:
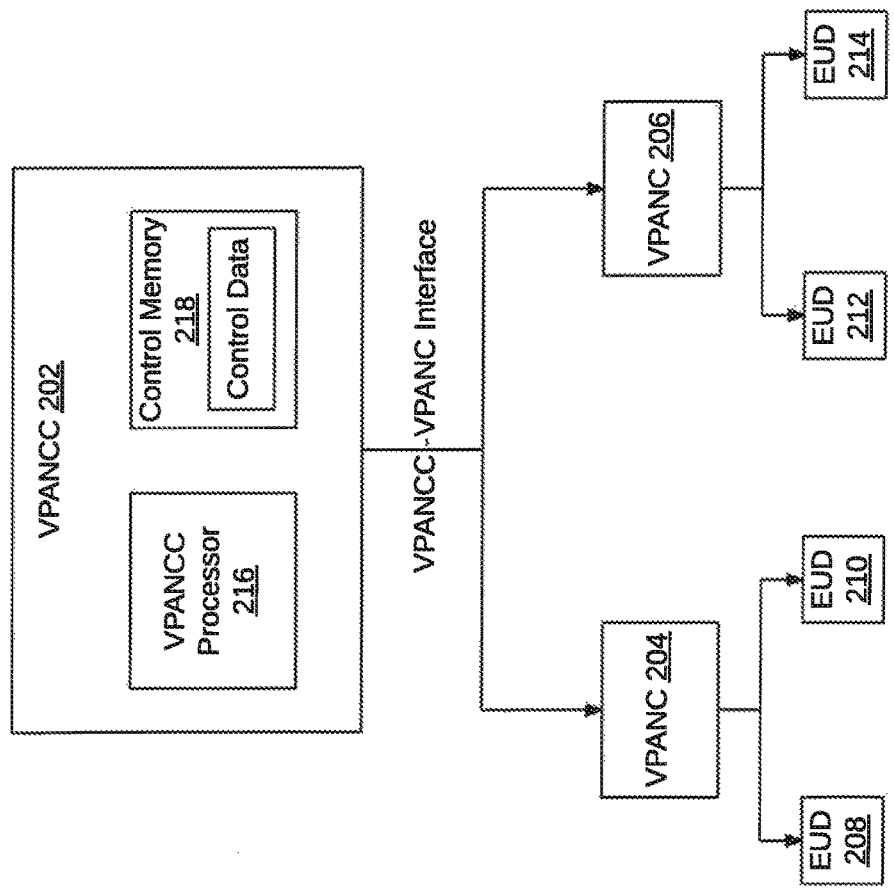
FIG. 2 is a block diagram illustrating a Li-Fi network comprising a Visible light communication Personal Area Network Coordinator Controller (VPANCC), in accordance with an embodiment.

Referring now to FIG. 2, a block diagram of a Li-Fi network 200 comprising a Visible light communication Personal Area Network Coordinator Controller (VPANCC) 202 is illustrated, in accordance with an embodiment. VPANCC 202 includes a network interface (not shown in FIG. 2) to keep it communicatively coupled to a plurality of VPANCs through a VPANCC-VPANC interface, which is a bi-directional interface. The plurality of VPANCs include a VPANC 204 and a VPANC 206, which are neighboring VPANCs. VPANCC 202 also uses a VPANCC configuration interface to communicate with an Operations Administration and Maintenance (OAM) entity to receive configuration parameters and send system level feedback to the OAM entity.

Each of the plurality of VPANCs is further communicatively coupled to a plurality of EUDs. In this embodiment, VPANC 204 is communicatively coupled to an EUD 208 and an EUD 210 that are within the coverage are of VPANC 204. Similarly, VPANC 206 is communicatively coupled to an EUD 212 and an EUD 214 that are within the coverage area of VPANC 206.

VPANCC 202 coordinates with VPANC 204 and VPANC 206 to collect VPANC information from each of VPANC 204 and VPANC 206 using the VPANCC VPANC interface. The VPANC information collected from a VPANC may include neighboring VPANC information, geo-location of the VPANC, current load on the VPANC, backhaul throughput configured for the VPANC, and currently used backhaul throughput by the VPANC. Neighboring VPANC information further includes channel quality measurement report for each neighboring VPANC of the VPANC and VPANC-ID for each neighboring VPANC.

Thus, VPANC information collected from VPANC 204 may include information on VPANC 206 (neighboring VPANC information), geo-location of VPANC 204, current load on VPANC 204, backhaul throughput configured for VPANC 204, and currently used backhaul throughput by VPANC 204. The information on VPANC 206 (which is the neighboring VPANC information) may include channel quality measurement report for VPANC 206 and VPANC-Identifier (ID) for VPANC 206. Similarly, VPANC information collected from VPANC 206 may include information on VPANC 204, geo-location of VPANC 206, current load on VPANC 206, backhaul throughput configured for VPANC 206, and currently used backhaul throughput by VPANC 206. The information on VPANC 204 (which is the neighboring VPANC information) may include channel quality measurement report for VPANC 204 and VPANC-ID for VPANC 204.

Using the VPANC information collected from VPANC 204 and VPANC 206, a VPANCC processor 216 in VPANCC 202 creates one or more channel scan parameters and one or more VPANC controlling parameters for VPANC 204 and VPANC 206. VPANCC processor 216 is a special purpose processor that additionally performs dead zone detection within its coverage area. VPANC controlling parameters that are created for a VPANC of the plurality of VPANCs are associated with VPANCs and dead zones neighboring the VPANC. For example, VPANC controlling parameters created for VPANC 204 are associated with VPANC 206 and dead zones in vicinity of VPANC 204. Similarly, VPANC controlling parameters created for VPANC 206 are associated with VPANC 204 and dead zones in vicinity of VPANC 206.

VPANCC processor 216 stores and maintains the above information in a control memory 218 within VPANCC 202. VPANCC processor 216 may communicate with control memory 218 using Access Persistent Memory (APM) path. VPANCC processor 216 uses the APM path to access (for read and write operation) the data stored in control memory 218. The APM path is a bi-directional interface and is capable of accessing individual elements stored in control memory 218. In an exemplary embodiment, the control data stored in control memory 218 may include the following information:

VPANC controlling parameters associated with a VPANC of the plurality of VPANCs include number of neighboring VPANCs of the VPANC, list of the neighboring VPANCs, geo-location of dead zones near the VPANC, and VPANC measurement reports associated with each neighboring VPANC. Thus, VPANC controlling parameters stored for VPANC 204 may include number of neighboring VPANCs of VPANC 204 i.e., 1, list of the neighboring VPANCs (this would include VPANC 206), geo-location of dead zones near VPANC 204, and VPANC measurement reports associated with VPANC 206 (neighboring VPANC of VPANC 204). Similarly, VPANC controlling parameters stored for VPANC 206 may include number of neighboring VPANCs of VPANC 206, i.e., 1, list of the neighboring VPANCs (this would include VPANC 204), geo-location of dead zones near VPANC 206, and VPANC measurement reports associated with VPANC 204 (neighboring VPANC of VPANC 206).

The list of neighboring VPANCs for a particular VPANC is used by that VPANC to perform channel scan and gather channel quality measurement for each neighboring VPANC in the list of neighboring VPANCs. Thus, this information for VPANC 204 may be used to collect channel quality measurement for VPANC 206. Similarly, such information stored for VPANC 206 may be used to collect channel quality measurement for VPANC 204.

Further, a VPANC measurement report associated with a neighboring VPANC of a VPANC includes VPANC-ID of the neighboring VPANC, channel quality of the neighboring VPANC as measured by the VPANC, geo-location of the neighboring VPANC, current load of the neighboring VPANC, backhaul throughput configured for the neighboring VPANC, and currently used backhaul throughput for the neighboring VPANC.

Thus, the VPANC controlling parameters for VPANC 204 may include VPANC measurement report associated with VPANC 206 (neighboring VPANC of VPANC 204). This VPANC measurement report includes VPANC-ID of VPANC 206, channel quality of VPANC 206 as measured by VPANC 204, geo-location of VPANC 206, current load of VPANC 206, backhaul throughput configured for VPANC 206, and currently used backhaul throughput for VPANC 206. Similarly, the VPANC controlling parameters for VPANC 206 includes VPANC measurement report associated with VPANC 204 (neighboring VPANC of VPANC 206). This VPANC measurement report includes VPANC-ID of VPANC 204, channel quality of VPANC 204 as measured by VPANC 206, geo-location of VPANC 204, current load of VPANC 204, backhaul throughput configured for VPANC 204, and currently used backhaul throughput for VPANC 204.

VPANC processor 216 stores the above information as control data in control memory 218. The control data also includes the one or more VPANC controlling parameters created for the plurality of VPANCs. Control data for each VPANC is stored in a separate memory space of control memory 218. In an exemplary embodiment, control data stored in control memory 218 may include following data:

List of Subordinate VPANCs

This will include all active subordinate VPANCs controlled by VPANCC 202. This list, for example, may include VPANC 204 and VPANC 206. This list may be provided to VPANCC 202 at regular intervals by the OAM entity through the VPANCC configuration interface. The list may be represented as:

SubOrdinateVPANCList<1, 2, . . . n> where, n is the total number of VPANCs

Number of Subordinate VPANCs

This includes the number of entries in the list of subordinate VPANCs. With reference to FIG. 2, this number would be 2 (VPANC 204 and VPANC 206). This data may be represented as:

NumberOfVPANCs=n

Control Parameters:

For each VPANC in SubOrdinateVPANCList, the control parameters are maintained in separate memory space of control memory 216, such that, control parameters for a given VPANC can be easily accessed individually.

Subordinate VPANC ID:

This is the VPAN ID of the $i^{th}$ subordinate VPANC and may be represented as:

$VPANC\_SUB_{ID\_i}$ where,

'i' ranges from 1 to n

Channel Scan Parameters (CSPs) for Each VPANC in SubOrdinateVPANCList:

VPANCC processor 214 creates and maintains CSPs for each VPANC present in the SubOrdinateVPANCList. As discussed above, channel scan parameters are created using VPANC information received from all VPANCs in the SubOrdinateVPANCList. The channel scan parameters for a given VPANC may be represented as:

$CSP_{\_i}$, where,

'i' ranges from 1 to n

Default CSP

The OAM entity shares default CSP for the $i^{th}$ VPANC, identified by: $VPANC\_SUB_{ID\_i}$. VPANCC processor 214 uses the default CSP to prepare $CSP_{\_i}$ for the $i^{th}$ VPANC. The default CSP may be represented as:

$CSP_{Default\_i}$

Default VPANC Control Parameters

The OAM entity shares the default VPANC control parameters with VPANCC 202 for $i^{th}$ VPANC identified by: $VPANC\_SUB_{ID\_i}$. The default VPANC control parameters are then used by VPANCC processor 214 to prepare VPANC control parameters for the $i^{th}$ VPANC. The default VPANC control parameters may be represented as:

$VPANCCP_{default}$

VPANC Control Parameters for Each VPANC in SubOrdinateVPANCList

VPANCC processor 216 prepares and maintains VPANC control parameters for each VPANC based on VAPNC information received from all subordinate VPANCs as explained above. The VPANC control parameters for a particular VPANC may be represented as:

$VPANCCP_{\_i}$, where,

'i' ranges from 1 to n.

Stale Tuner

This timer is used to check whether available $CSP_{\_i}$ and $VPANCCP_{\_i}$ are still relevant or not. This timer value is also provided by the OAM entity. The stale timer may be represented as:

$timer_{VPANCCstale\_i}$

Neighboring VPANC Channel Quality Threshold

This is the channel quality threshold value that is used to determine whether $VPANCCP_{\_i}$ and $CSP_{\_i}$ for a neighboring VPANC of a subordinate VPANC should be considered or not. The channel quality threshold may be represented as:

$NeighChannelQuality_{Threshold}$

Any neighboring VPANC for which the channel quality falls below $NeighChannelQuality_{Threshold}$, may be removed from the list of the neighboring VPANCs. For example, if channel quality for VPANC 206 falls below the channel quality threshold, VPANC 206 is removed from the list of neighboring VPANCs stored for VPANC 204.

Further, $VPANCCP_{\_i}$ created for the $i^{th}$ VPANC further includes information given in table 1 below:

TABLE 1

| VPANC Control Parameter | Description |
| --- | --- |
| Geo-location of dead-zones present near subordinate VPANC | This is information regarding location of dead-zones present near the $i^{th}$ VPANC. This information is provided to an EUD via the $i^{th}$ VPANC for detecting Li-Fi connection availability. This may be represented as: $DeadZone_{geoloc\_i}$ |
| Neighbor VPANC list | This is the list of neighboring VPANCs for a subordinate VPANC. This list is provided to the subordinate VPANCs for performing channel scan and channel quality measurement for neighboring VPANCs. For example, neighboring VPANC list for VPANC 204 includes VPANC 206 and this list is used by VPANC 204 to perform channel scan on VPANC 206 and to perform channel quality measurement for VPANC 206. The neighboring VPANC list for $i^{th}$ VPANC may be represent as:<br>$NeighborVPANList_i <1,2,...k>$<br>where,<br>k is the total number of neighboring VPANCs for the $i^{th}$ VPANC. |
| Number of neighbors of $i^{th}$ VPANC | This gives the number of entries in the $NeighborVPANList_i$. In other words, it indicates the number of neighboring VPANCs for the $i^{th}$ VPANC. This may be represented as:<br>$NumberOfNeighbors_i$<br>Further, for each VPANC included in $NeighborVPANList_i$, information given below is maintained in separate memory space so that they can be accessed individually. |
| Neighbor VPANC measurement report | This is a VPANC measurement report for the $j^{th}$ neighboring VPANC of the $i^{th}$ VPANC as reported by the $i^{th}$ VPANC. The neighbor VPANC measurement report may be represented as:<br>$NeghborVPANC_{MeasReport\_ij}$,<br>where,<br>'j' ranges from 0 to "$NumberOfNeighbors_i$".<br>A neighbor VPANC measurement report for $j^{th}$ neighboring VPANC of the $i^{th}$ VPANC may include the information given in Table 2. |

TABLE 2

| Type of Neighbor VPANC information | Description |
| --- | --- |
| Neighbor VPANC ID | This is the VPANC ID of the $j^{th}$ neighboring VPANC of the $i^{th}$ VPANC. This may be represented as: $VPANC\_Neigh_{ID\_ij}$ |
| Neighbor VPANC Channel quality | This is the channel quality of the $j^{th}$ neighboring VPANC as measured by the $i^{th}$ VPANC. The $i^{th}$ VPANC is provided this information to prepare VPANC selection policy and customized channel scan parameters for an EUD. The neighbor VPANC channel quality may be represented as:<br>$NeghborVPANC_{ChQuality\_ij}$ |
| Geo-location of neighboring VPANC | This is the geo-location of $j^{th}$ neighboring VPANC of the $i^{th}$ VPANC. This information is also used by the $i^{th}$ VPANC to prepare VPANC selection policy and customized channel scan parameters for an EUD. The geo-location may be represented as:<br>$VPANC_{geolocNeigh\_ij}$ |
| Current Load on a neighboring VPANC | This is the current load on $j^{th}$ neighboring VPANC of the $i^{th}$ VPANC. This information is also used by the $i^{th}$ VPANC to prepare VPANC selection policy and customized channel scan parameters for an EUD. The current load may be represented as: $VPANC_{loadNeigh\_ij}$ |
| Configured backhaul throughput for neighboring VPANC | This is the configured backhaul throughput for $j^{th}$ neighboring VPANC of the $i^{th}$ VPANC. This information is also used by the $i^{th}$ VPANC to prepare VPANC selection policy and customized channel scan parameters for an EUD. The configured backhaul may be represented as:<br>$VPANC_{configTpNeigh\_ij}$ |
| Currently used backhaul throughput by neighboring VPANC | This is the currently used backhaul throughput by $j^{th}$ neighboring VPANC of the $i^{th}$ VPANC. This information is also used by the $i^{th}$ VPANC to prepare VPANC selection policy and customized channel scan parameters for an EUD. The currently used backhaul may be represented as:<br>$VPANC_{usedTpNeigh\_ij}$ |

After creating the one or more channel scan parameters and the one or more VPANC controlling parameters, VPANCC processor 216 shares channel scan parameters and VPANC controlling parameters associated with one or more of the plurality of VPANCs with each of the plurality of VPANCs. In other words, VPANCC processor 216 shares channels scan parameters and VPANC controlling parameters created for VPANC 204, with VPANC 204 and channels scan parameters and VPANC controlling parameters created for VPANC 206, with VPANC 206.

In addition to receiving channel scan parameters and VPANC controlling parameters from VPANCC 202, each VPANC also requests EUD information from each of the plurality of EUDs associated with it. By way of an example, VPANC 204 may request EUD information from both EUD 208 and EUD 210. EUD information for an EUD may include, but is not limited to geo-location of the EUD and channel quality measurement reports for neighboring VPANCs of the EUD.

Based on the received information, a VPANC creates a set of customized channel scan parameters and a VPANC selection policy for each of the plurality of EUDs. By way of an example, VPANC 204 may create a set of customized channel scan parameters and a VPANC selection policy for each of EUD 208 and EUD 210. Thereafter, the VPANC stores control data in a control memory within the VPANC. In an exemplary embodiment, control data stored in the control memory includes the following:

Geo-Location of a VPANC
This represent own geo-location of the VPANC and is used to create one or more VPANC selection policy and customized channel scan parameters for each of the plurality of EUDs associated with the VPANC. This may be represented as:
$VPANC_{geoloc}$ Default VPANC Selection Policy
This is the VPANC selection policy received from the OAM entity. The VPANC uses the default VPANC selection policy to create VPANC selection policy for each of the plurality of EUDs. This may be represented as:
$VPANSP_{default}$ Stale Timer
The stale timer is used to check whether customized channel scan parameters and VPANC selection policy created for a specific EUD is still relevant or not. The value for stale timer is received from the OAM entity. The stale timer may be represented as:
$timer_{VPANCstale}$ Geo-Location of a Requester EUD
This geo-location of an EUD that is requesting for customized channel scan parameters and VPANC selection policy created for it. The geo-location is used to create the customized channel scan parameters and VPANC selection policy for the EUD. This may be represented as:
$EUD_{geoloc}\_requester$ Distance Between EUDs Associated with a VPANC
This is the distance between two EUDs and is calculated using geo-location of the two EUDs. By way of an example, for VPANC 204, this may be distance between EUD 208 and EUD 210. This distance may be represented as:
$Distance_{EudReq\_EudAssoc}$ Threshold Distance Between a Requested EUD and Another EUD Associated with the VPANC
This is the threshold value in terms of distance between an EUD associated with the VPANC and the requester EUD. This threshold distance is used to determine whether measurement report from the associated EUD is valid or not. The threshold distance may be represented as:
$ThresholdDistance_{EudReq\_EudAssoc}$ Threshold of Channel Quality
This is the threshold value in terms of channel quality of a neighboring VPANC of an associated EUD as measured by the associated EUD. This threshold value is used to determine whether the neighboring VPANC should be considered as a candidate VPANC. This threshold may be represented as:
$ThresholdNeghborVPANC_{ChQualEud}$ List of EUDs Associated with the VPANC
This is the list of EUDs that are already associated with the VPANC. This may be represented as:
AssociatedEUDList<1, 2 . . . n>
where,
'n' is the total number of EUDs associated with the VPANC Number of EUDs Associated with the VPANC
This is the number of entries in AssociatedEUDList and may be represented as,
NumberOfEUDs For each entry in the AssociatedEUDList, EUD parameters are maintained. These EUD parameters are depicted in Table 3 given below. For each of these EUD parameters value of 'i' ranges from 0 to NumberOfEUDs.

TABLE 3

| EUD Parameter | Description |
| --- | --- |
| Geo-location of an EUD | This is the geo-location of the EUD and is used by the VPANC to create customized channel scan parameters and the VPANC selection policy for the EUD. The geo-location of an EUD may be represented as: $EUD_{geoloc\_i}$ |
| Customized Channel scan parameters for an EUD | These are the channel scan parameters for an EUD after they have been customized for that EUD by the VPANC based on channel quality measurement and geo-location associated with the EUD and geo-location of the, requester EUD. The customized channel scan parameters are provided to the requester EUD and enables the requester EUD to perform channel scanning. For an $i^{th}$ EUD, this may be represented as: $CCSP_i$. For a current EUD under consideration, $CCSP_i$ is represented as: $CCSP_{cand}$ |
| Channel quality of a neighboring VPANC of an EUD | For each neighboring VPANC entry in $CCSP_i$ associated with an EUD, the channel quality of a neighboring VPANC is given by this EUD parameter. This information is received from the EUD through an 'EUD_VPANC_CHANNEL_MEASURE_RES' message. The channel quality of a neighboring VPANC may be represented as: $NeghborVPANC_{ChQualEud\_ij}$ where, 'j' ranges from 1 to total number of neighboring VPANCs of the EUD |
| VPANC selection policy for an EUD | This is the VPANC selection policy formed by the VPANC based on VPANC control parameters received from VPANCC 202 and geo-location of requester EUD. The VPANC selection policy is provided to the requester EUD and enables the requester EUD to select a suitable VPANC from a list of avaliable VPANCs, which is obtained when the requester EUD performs channel scan using the customized channel scan parameters created for the requester EUD. VPANC selection policy for $i^{th}$ EUD may be represented as: $VPANSP_i$ For the current EUD under consideration, $VPANSP_i$ is represented as $VPANSP_{cand}$. The $VPANSP_{cand}$ further includes parameters given in table 4. |

TABLE 4

| VPANSP$_{cand}$ parameters | Description |
|---|---|
| List of candidate VPANCs | This is the list of all VPANCs which can be considered for new association by the current EUD. For each candidate VPANC in this list, suitability requirement parameters, for example, geo-location of the candidate VPANC, current load on the candidate VPANC, dead zone around the candidate VPANC, are maintained. These are given in detail in table 5. These suitability requirement parameters are provided to the current EUD (the requester EUD). This list may be represented as: CandidateVPANCList<1,2,....k> where, 'k' is the total number of candidate VPANCs in the list |
| Number of candidate VPANCs in the list of candidate VPANCs | This is the total number of candidate VPANCs in the CandidateVPANCList. This may be represented as: NumberCandidateVpanc |

TABLE 5

| Suitability Requirement Parameter | Description |
|---|---|
| Candidate VPANC ID | This is the VPANC ID of a candidate VPANC. This ID is used to identify the candidate VPANC and may be represented as: VPANC_cand$_{ID}$ |
| Geo-location of a candidate VPANC | This is the geo-location of a candidate VPANC. This information is provided to a requester EUD and is used by the requester EUD to check suitability of the candidate VPANC. This may be represented as: VPANC_cand$_{geoloc}$ |
| Geo-location of dead-zones present near a candidate VPANC | This is geo-location of dead-zones present near a candidate VPANC. This information is used by an EUD to detect availability of Li-Fi connection and may be represented as: VPANC_cand$_{DeadZone}$ |
| Current load on a candidate VPANC | This is the current load on a candidate VPANC. This information is provided to a requester EUD and us used by the requester EUD to check suitability of the the candidate VPANC for a future association. The current load on a candidate VPANC may be represented as: VPANC_cand$_{load}$ |
| Configured back haul throughput for a candidate VPANC | This is the backhaul throughput configured for a candidate VPANC. This information is used by the requester EUD to check suitability the candidate VPANC. This may be represented as: VPANC_cand$_{configTp}$ |
| Currently used back haul throughput for a candidate VPANC | This is the backhaul throughput that is currently used by the candidate VPANC. This information is used by the requester EUD to check suitability of the candidate VPANC. This may be represented as: VPANC_cand$_{usedTp}$ |

A VPANC then shares an associated set of customized channel scan parameters and VPANC selection policy with each EUD of the plurality of EUDs associated with the VPANC. By way of an example, VPANC 204 shares with EUD 208, the set of customized channel scan parameters and the VPANC selection policy created for EUD 208. Similarly, VPANC 204 shares with EUD 210, the set of customized channel scan parameters and the VPANC selection policy created for EUD 210.

Thereafter, an EUD uses the set of customized channel scan parameters and the VPANC selection policy to select a candidate VPANC form the list of candidate VPANC. The EUD then associates with the candidate VPANC so selected. This is further explained in detail in conjunction with FIGS. 4, 5, 6A, and 6B.

Figure 3:
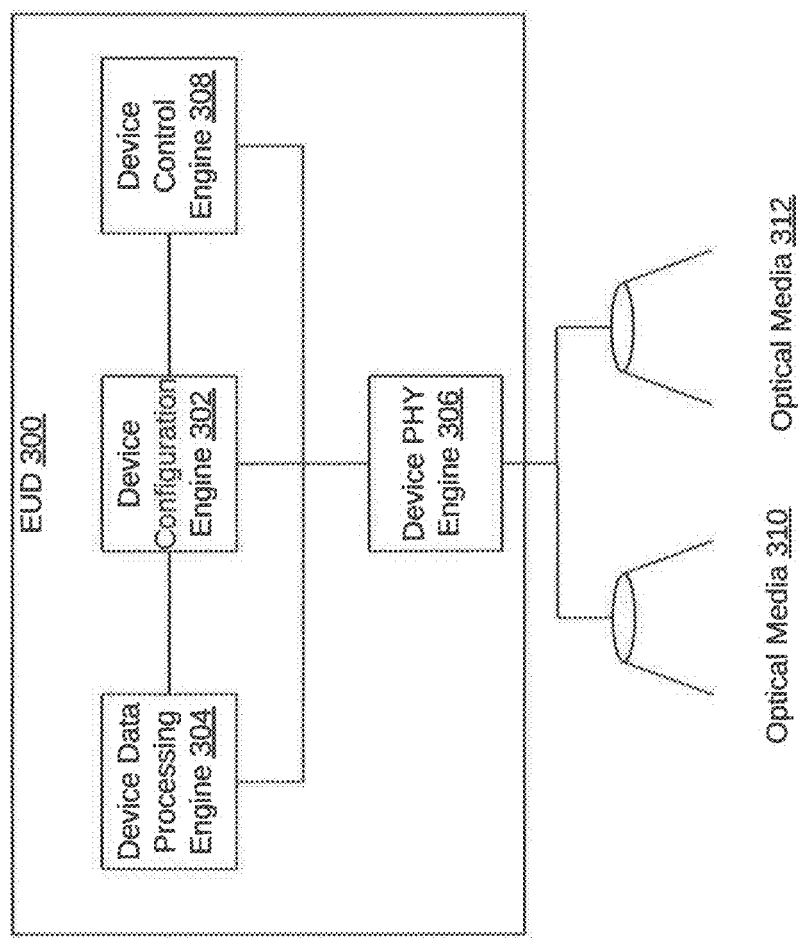
FIG. 3 is a block diagram illustrating various components of an End User Device (EUD), in accordance with an embodiment.

Referring now to FIG. 3, a block diagram of various components of an EUD 300 is illustrated, in accordance with an embodiment. EUD 300 is analogous to each of EUD 208, EUD 210, EUD 212, and EUD 214 illustrated in FIG. 2. EUD 300 is associated with a current VPANC and includes a device configuration engine 302, a device data processing engine 304, a device PHY engine 306, and a device control engine 308.

Device configuration engine 302 is responsible for configuration of EUD 300. Device configuration engine 302 includes a memory and a processor (not shown in FIG. 3.) The memory is a non-volatile memory that stores the configuration data received through the current VPANC from the OAM entity. The processor accesses the memory to retrieve configuration data and to configure each of device data processing engine 304, device PHY engine 306, and device control engine 308 in EUD 300. The additional functionalities performed by the processor in device configuration engine 302 may include, but are not limited to receiving configuration parameters from the OAM entity via the current VPANC and storing them in the memory at start up, bringing up and reconfiguring data processing engine 304, device PHY engine 306, and device control engine 308, updating feedback to the OAM entity, via the current VPANC, to help the OAM entity change configuration parameters, if required. Other functionalities of device configuration engine 302 are explained in detail in IEEE Standard 802.15.7™-2011, which is incorporated herein by reference.

Device data processing engine 304 carries user data exchanged with the current VPANC. Device data processing engine 302 includes a processor and a memory. The processor in device data processing engine 302 receives configuration data from device configuration engine 302 and configures device data processing engine 304. The processor receives user data from the current VPANC that EUD 300 is associated with and then shares it with an application within EUD 300 requiring that data. The processor also sends data to the current VPANC through device PHY engine 306. The processor stores data in the memory, which is a volatile memory. Other functionalities of device data processing engine 304 are explained in detail in IEEE Standard 802.15.7™-2011, which is incorporated herein by reference.

Device PHY engine 306 facilitates exchange of information between EUD 300 and its various components with the current VPANC. Moreover, device PHY engine 306 sends control data to an optical media 310 and an optical media 312, thereby controlling their functions. Optical media 310 and 312, for example, may be an LED lamp or a photo detector. Other functionalities of device PHY engine 306 are explained in detail in IEEE Standard 802.15.7™-2011, which is incorporated herein by reference.

Device control engine 308 in EUD 300 carries control messages with the current VPANC. Device control engine 308 includes a control processor that receives configuration data from device configuration engine 302 to configure device control engine 308. The control processor controls the connection with the current VPANC and performs functionalities that may include, but are not limited association with a VPANC, beacon reception from the current VPANC, channel scan to detect available VPANCs, channel access, disassociation from the current VPANC, mobility control, and dimming control. The control processor also receives a set of customized channel scan parameters and a VPANC selection policy from the current VPANC. The set of customized channel scan parameters and the VPANC selection policy are created by the current VPANC for EUD 300. The information received from the current VPANC is then used to switch to a new VPANC and associate with it for future communication. Device control engine 308 and its functionalities are further explained in detail in conjunction with FIG. 4.

Figure 4:
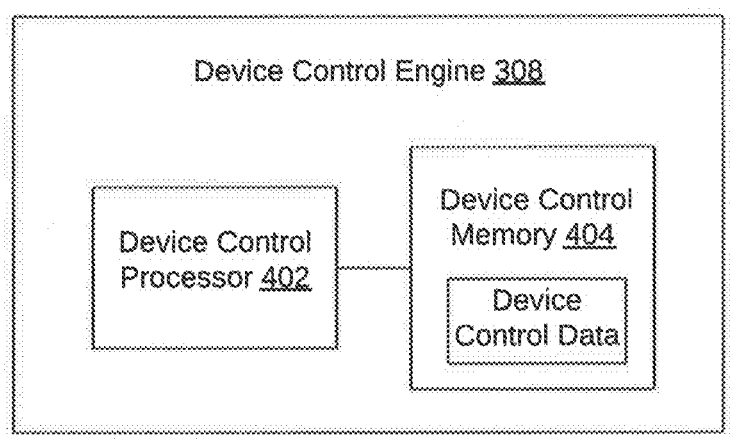
FIG. 4 is a block diagram illustrating various components of a device control engine, in accordance with an embodiment.

Referring now to FIG. 4, a block diagram illustrating various components of device control engine 308 is disclosed, in accordance with an embodiment. Device control engine 308 includes a device control processor 402 and a device control memory 404, which includes device control data. Device control processor 402 receives a set of customized channel scan parameters and a VPANC selection policy from a current VPANC the EUD is associated with. The set of customized channel scan parameters and the VPANC selection policy are created by the current VPANC. By way of an example, EUD 208 may receive the set of customized channel scan parameters and the VPANC selection policy from VPANC 204, which is the current VPANC for EUD 208. In an exemplary embodiment, EUD 300 sends an 'EUD_VPANC_CONFIG_REQ' message to the current VPANC EUD 300 is associated with_to request the customized channel scan parameters and the VPANC selection policy.

The information received from the current VPANC is used by device control processor 402 to store device control data in device control memory 404. The device control data may include, but is not limited to a set of default channel scan parameters, a default VPANC selection policy, a predefined channel quality threshold of an associated VPANC, associated VPANC ID, a periodic channel assessing timer, the set of customized channel scan parameters, the VPANC selection policy, list of available VPANCs obtained after channel scan performed by EUD, IDs of the available VPANCs, channel quality associated with the available VPANCs, a list of VPANCs provided in the VPANC selection policy, a list of newly detected VPANCs not present in the list of VPANCs provided in the VPANC selection policy, effective distance between the EUD and each VPANC in the list of available VPANCs, effective distance between the EUD and dead zones neighboring a VPANC the EUD is currently associated with, effective rank of each VPANC in the list of available VPANCs, geo-location of the EUD, and quality of the active channel currently used by the EUD. The list of available VPANCs includes the list of VPANCs provided in the VPANC selection policy and the list of newly detected VPANCs.

In an exemplary embodiment, parameters in the device control data may be represented in table 6. These parameters are configured by device configuration engine 302 using data received form the OAM entity:

TABLE 6

| Device Control Data | Description |
| --- | --- |
| Geo-location of the EUD | This is the geolocation of the EUD and is represented as: $EUD_{geoloc}$ |
| Associated VPANC | This is the VPANC with which the EUD is currently associated. This VPANC may be represented as: $VPANC_{assoc}$ |
| Default channel scan parameters | These are the default channel scan parameters that can be used by device control processor 402 to perform channel scan before any CCSP is received from the current VPANC (or $VPANC_{assoc}$). This is configured by device configuration engine 302 using data received form the OAM entity. Default channel scan parameters for an EUD may be represented as: $defaultCSP_{EUD}$ |
| Default VPANC selection policy | The default VPANC selection policy can be used by device control processor for selecting a suitable VPAN before a VPANC selection policy created for EUD 300 is received from $VPANC_{assoc}$. The default VPANC selection policy may be represented as: $defaultVPANSP_{EUD}$ |
| Channel quality threshold of the current VPANC | This is the threshold value of the channel quality of the current VPANC below which a channel would be considered as a bad channel. This is used by EUD 300 to monitor and maintain the Li-Fi Connectivity. This threshold may be represented as: $ChannelQuality_{thCurrVpanc}$ |
| Periodic channel assessing timer | This is the timer used to periodically assess quality of current active channels and may be represented as: $timer_{periodicChannelAssess}$ |
| Current channel scan parameter of the EUD | These are the CCSP that have to be used by the EUD for channel scan purpose. Initially these are set to $defaultCSP_{EUD}$ and later changed to CCSP once received from the $VPANC_{assoc}$. This may be represented as: $CSP_{EUD}$ |
| Current VPANC selection policy of the EUD | This is VPANC selection policy that has to be used by the EUD for selecting the most suitable VPANC. Initially it is set to $defaultVPANSP_{EUD}$. This may be represented as: $VPANSP_{EUD}$ |
| List of available VPANCs after channel scan performed by the EUD | This is the list of available VPANCs reported by device PHY engine 306 after channel scan is performed using $CSP_{EUD}$. The list may be represented as: AvailableVPANCList<1,2,...k> where, 'k' is the total number of available VPANCs This list also includes the following parameters:<br>- ID of an available VPANC, which may be represented as: $VPANC_{ID}$.<br>- Measured channel quality of an available VPANC, which may be represented as: $VPANC_{ChannelQuality}$ |

TABLE 6-continued

| Device Control Data | Description |
| --- | --- |
| List of VPANCs provided in the VPANC selection policy | This is the subset derived from AvailableVPANCList based on the fact that the $VPANC_{ID}$ is present in CandidateVPANCList of $VPANSP_{EUD}$. This may be represented as: $AvailableVPANCList_{provided}$ |
| List of newly detected VPANCs not present in the list of VPANCs provided in the VPANC selection policy | This is the subset derived from AvailableVPANCList based on the fact that it is newly detected by the EUD and not present in $VPANSP_{EUD}$. This may be represented as: $AvailableVPANCList_{detected}$ |
| Effective distance between the EUD and a VPANC in the list of available VPANCs | This is the effective distance of the EUD from a VPANC considering $EUD_{geoloc}$ and $VPANC_{geoloc}$. This parameter is used by EUD 300 to select a specific VPANC for association. This may be represented: $Effective\ Distance_{vpanc}$ |
| Effective distance between the EUD and a dead zone neighboring a candidate VPANC | This is the effective distance of the EUD from dead zone near a candidate VPANC and is computed using $EUD_{geoloc}$ and $VPANC\_cand_{DeadZone}$. This is represented as: $EffectiveDistance_{deadZone}$ |
| Effective rank of a candidate VPANC | This is the rank value that is calculated for the candidate VPANC using $EffectiveDistance_{vpanc}$, $EffectiveDistance_{deadZone}$, $VPANC\_cand_{load}$, $VPANC\_cand_{configTp}$, $VPANC\_cand_{usedTp}$, and $VPANC_{ChannelQuality}$. The effective rank for the candidate VPANC may be represented as: $VPANC_{effRankValue}$ |
| Sorted VPANC list for the available VPANCs | This is the sorted list of available VPANCs after considering $VPANC_{effRankValue}$. The VPANC from this list which is currently tried for association is termed as: VPANCcandidate. The sorted VPANC list may be represented as: $AvailableVPANCList_{sorted}$ |
| Quality of the active channel currently used by the EUD | This is the channel quality of a current channel associated with the current VPANC ($VPANC_{assoc}$) being used by the EUD. This is measured by device PHY engine 302 and may be represented as: CurrentChannelQuality |

Device control processor 402 then assesses quality of the active channel currently used by the EUD. The active channel is associated with the current VPANC. Based on the assessment made by device control processor 402, EUD 300 switches to a new VPANC using the set of customized channel scan parameters and the VPANC selection policy that were shared by the current VPANC. The method of switching to the new VPANC is explained in detail in conjunction with FIGS. 5, 6A, and 6B.

Figure 5:
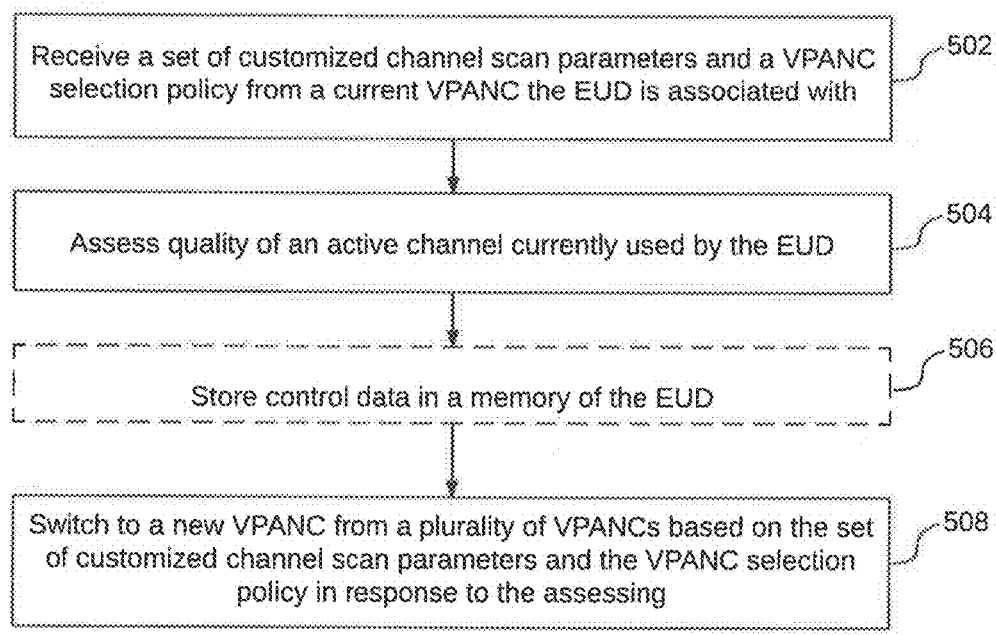
FIG. 5 illustrates a flowchart of a method for selecting VPANCs, in accordance with an embodiment.

Referring now to FIG. 5, a method for selecting VPANCs is illustrated, in accordance with an embodiment. At 502, EUD 300 receives a set of customized channel scan parameters and a VPANC selection policy from a current VPANC the EUD is associated with. The set of customized channel scan parameters and the VPANC selection policy are created by the current VPANC.

At 504, EUD 300 assesses quality of an active channel associated with the current VPANC that is currently being used by the EUD for communication. EUD 300 performs the quality assessment by comparing quality of the active channel currently used by the EUD with a predefined channel quality threshold after expiry of a periodic channel assessing timer, in other words, every time the periodic channel assessing timer expires, EUD 300 performs the comparison.

In an embodiment, at 506 device control processor 402 may store control data that includes the set of customized channel scan parameters and the VPANC selection policy in device control memory 404 of EUD 300. The control data has been explained in detail in conjunction with FIG. 4.

In response to assessing, EUD 300 switches, at 508, to a new VPANC based on the set of customized channel scan parameters and the VPANC selection policy. This switch is performed by EUD 300, when the quality of the active channel currently used by the EUD is below the predefined channel quality threshold. In an embodiment, before switching to a new VPANC, EUD 300 may search for an active channel that meets the predefined channel quality threshold. If EUD 300 finds such active channel associated with the current VPANC, EUD 300 may switch to that active channel and not a new VPANC. This is further explained in detail in conjunction with FIGS. 6A and 6B.

Figure 6A:
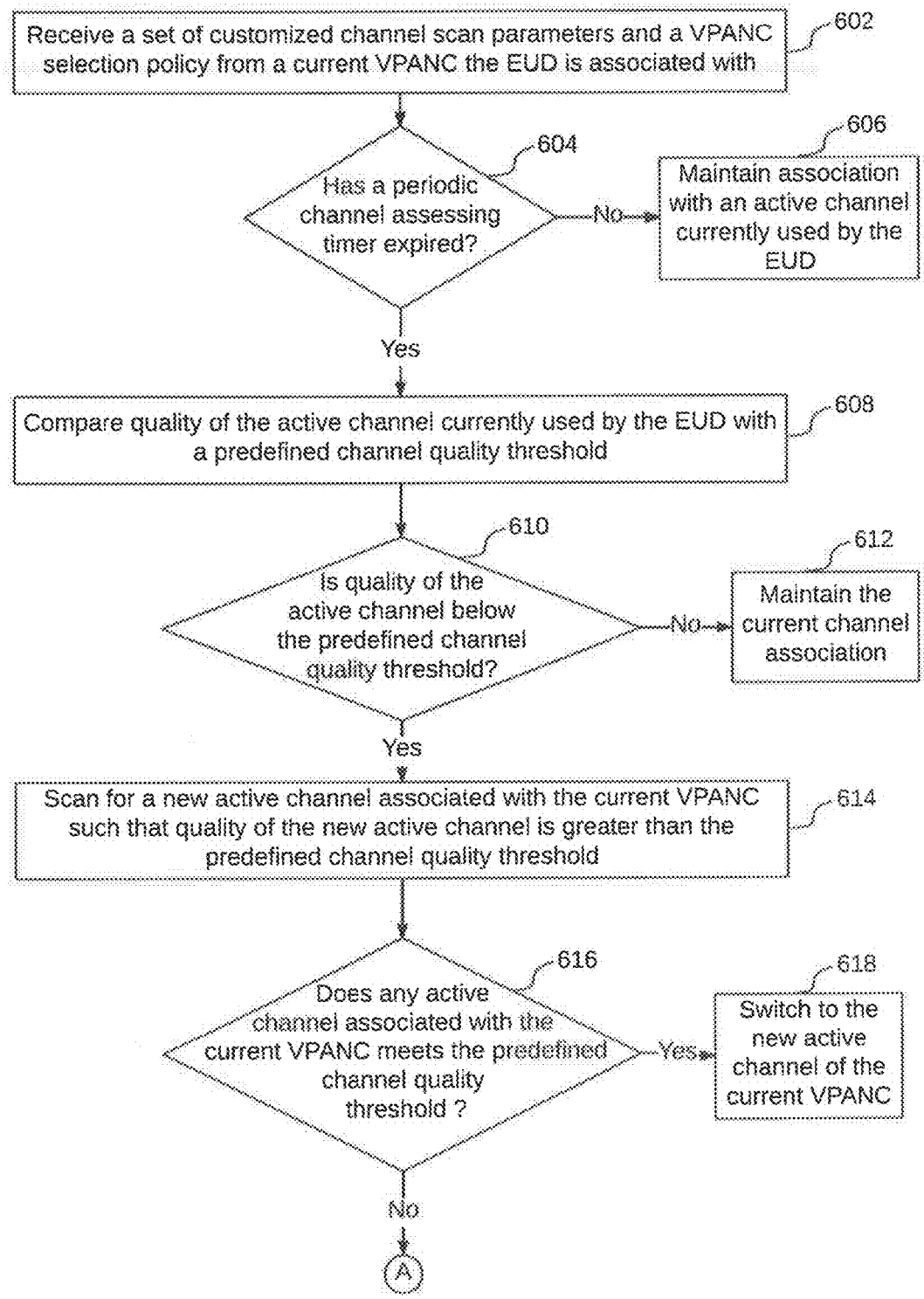
FIGS. 6A and 6B illustrate a flowchart of a method for selecting VPANCs, in accordance with another embodiment.
Figure 6B:
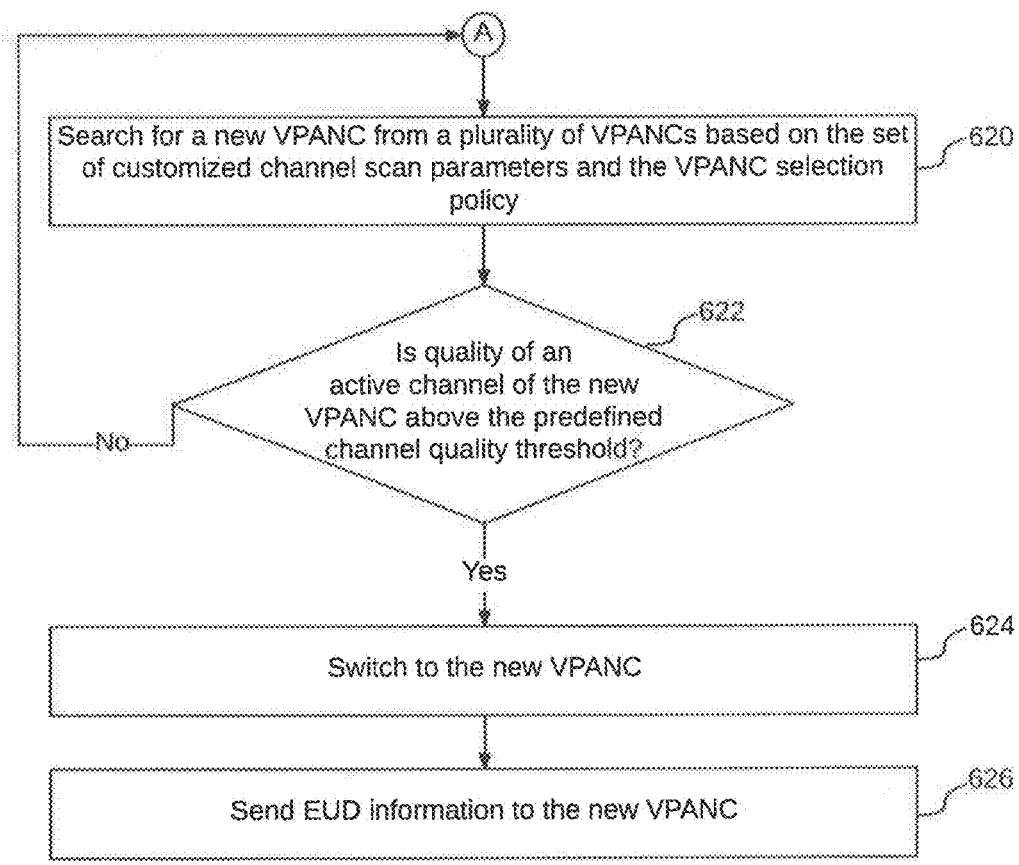

Referring now to FIGS. 6A and 6B, a flowchart of a method for selecting VPANCs is disclosed, in accordance with another embodiment. At 602, EUD 300 receives a set of customized channel scan parameters and a VPANC selection policy from a current VPANC the EUD is associated with. This has been explained in conjunction with FIG. 5. Thereafter, at 604, a check is performed to determine whether a periodic channel assessing timer ($timer_{periodicChannelAssess}$) has expired. If the periodic channel assessing timer has expired, EUD 300, at 606, maintains association with the active channel that is being currently used by EUD 300. However, if the periodic channel assessing timer has expired, EUD 300 compares quality of the current active channel used by EUD 300 with a predefined channel quality threshold ($ChannelQuality_{thCurrVpanc}$) at 608.

At 610, EUD 300 determines whether quality of the current active channel is below the predefined channel quality threshold. If the quality of the current active channel is above the predefined channel quality threshold, EUD 300 maintains, at 612, association with the current active channel. However, if the quality of the current active channel is below the predefined channel quality threshold, EUD 300, at 614, scans for a new active channel associated with the current VPANC, such that quality of the new active channel is greater than the predefined channel quality threshold.

Thereafter, at 616, EUD 300 performs a check to determine whether any active channel associated with the current VPANC meets the predefined channel quality threshold criterion. If such an active channel is available with the current VPANC, EUD 300, at 618, switches to that active channel associated with the current VPANC. However, in absence of availability of such an active channel associated with the current VPANC, EUD 300, at 620, searches for a new VPANC based on the set of customized channel scan parameters ($CSP_{EUD}$) and the VPANC selection policy ($VPANSP_{EUD}$). The VPANC selection policy created for EUD 300 includes number of candidate VPANCs, list of the candidate VPANCs, and VPANC candidate parameters associated with each candidate VPANC in the list of candidate VPANCs. Further, VPANC candidate parameters for a candidate VPANC in the list of candidate VPANCs includes a candidate VPANC-Identifier (ID) of the candidate VPANC, geo-location of the candidate VPANC, geo-location of dead zones near the candidate VPANC, current load on the candidate VPANC, backhaul configured for the candidate VPANC, and backhaul currently used by the candidate VPANC.

Thereafter, at 622, EUD 300 performs a check to determine whether quality of an active channel of the new VPANC is above the predefined channel quality threshold. If no active channel of the new VPANC has quality above the predefined channel quality threshold, control goes back to 620 and EUD 300 performs search for a new VPANC. However, if quality of an active channel of the new VPANC is above the predefined channel quality threshold, EUD 300, at 624, switches to that active channel of the new VPANC. Thereafter, at 626, VPANCC 202 sends EUD information to the new VPANC. The EUD information includes geo-location of EUD 300 and channel quality measurement reports for VPANCs neighboring EUD 300.

Referring back to table 1, 2, 3, 4, 5, and 6, in an exemplary embodiment, selection of the new VPANC is performed using the method given below:

Step 1: Device control processor 402 initializes EUD 300. This step comprises the following:
$CSP_{EUD}$=default$CSP_{EUD}$ and $VPANSP_{EUD}$=default$VPANSP_{EUD}$
Timer=$timer_{periodicChannelAssess}$
AvailableVPANCList=Not Available (NA);
AvailableVPANCList$_{provided}$=NA;
AvailableVPANCList$_{detected}$=NA;
EffectiveDistance$_{vpanc}$=NA;
EffectiveDistance$_{deadZone}$=NA;
VPANCassoc=NA;
VPANC$_{candidate}$=NA;
EUD$_{geoloc}$ as received from the OAM entity Step 2: EUD 300 establishes a Li-Fi connection with a suitable VPANC. This step comprises the following:
Device control processor 402 instructs device PHY engine 302 to perform a channel scan providing $CSP_{Eud}$
Device control processor 402 obtains AvailableVPANCList from device PHY engine 302
For each VPANC in AvailableVPANCList, if VPANC$_{ID}$ of a VPANC is present in CandidateVPANCList of VPANSP$_{EUD}$, that VPANC is added to AvailableVPANCList$_{provided}$ list. Else, that VPANC is added to AvailableVPANCList$_{detected}$ list;
When AvailableVPANCList$_{provided}$ is not empty, for each entry in AvailableVPANCList$_{provided}$, device control processor 402 performs the following:
Calculates EffectiveDistance$_{vpanc}$=f(EUD$_{geoloc}$, VPANC_cand$_{geoloc}$)
Calculates EffectiveDistance$_{deadZone}$=f(EUD$_{geoloc}$, VPANC_cand$_{DeadZone}$)
Calculates VPANC$_{effRankValue}$= (VPANC_cand$_{configTp}$*VPANC$_{ChannelQuality}$ *EffectiveDistance$_{deadZone}$)/ (VPANC_cand$_{usedTp}$*EffectiveDistance$_{vpanc}$ *VPANC_cand$_{load}$)

Device control processor 402 obtains AvailableVPANCList$_{sorted}$ by sorting the AvailableVPANCList$_{provided}$ list based on VPANC$_{effRankValue}$ However, when AvailableVPANCList$_{provided}$ is empty, for each entry in AvailableVPANCList$_{detected}$, device control processor 402 performs the following:
Calculate VPANC$_{effRankValue}$=f(VPANC$_{ChannelQuality}$);
Obtain AvailableVPANCList$_{sorted}$ by sorting the AvailableVPANCList$_{detected}$ list based on VPANC$_{effRankValue}$ Device control processor 402 sets VPANC$_{candidate}$=VPANC$_{ID}$ of first entry in the AvailableVPANCList$_{sorted}$ Device control processor 402 associates with the VPANC$_{candidate}$ If association is unsuccessful, it Sets VPANC$_{candidate}$=VPANC$_{ID}$ of the next entry in AvailableVPANCList$_{sorted}$ and attempt association with VPANC$_{candidate}$ However, if association is successful, it sets VPANC$_{assoc}$=VPANC$_{candidate}$ Step 3: Device control processor 402 receives customized channel scan parameters (CCSP) and VPANC selection policy (VPANSP) from VPANC$_{assoc}$:
Device control processor 402 sends EUD_VPANC_CONFIG_REQ to VPANC$_{assoc}$ to obtain CCSP and VPANSP
VPANC$_{assoc}$ checks the timer$_{VPANCstale}$
If the timer$_{VPANCstale}$ has not expired:
VPANC$_{assoc}$ sends old CCSP$_{cand}$ & VPANSP$_{cand}$ to requester (EUD) using VPANC_EUD_CONFIG_RES
If the timer$_{VPANCstale}$ has expired:
VPANC$_{assoc}$ sends 'VPANC_VPANCC_COORDINATED_CONFIG_REQ' to VPANCC to obtain CSP and VPANCCP created for VPANC$_{assoc}$
VPANCC processor 216 checks if timer$_{VPANCCstale}$ has expired
If timer$_{VPANCCstale}$ has expired, VPANCC forms CSP and VPANCCP for VPANC$_{assoc}$:
For $i^{th}$ entry in SubOrdinateVPANCList, VPANCC sends NeighborVPANCList$_{-i}$ to $i_{th}$ subordinate VPANC
VPANC performs channel scan as on NeighborVPANCList$_{-i}$ and sends Neghbor VPANC$_{MeasReport\_ij}$ to VPANCC
VPANCC processor 216 receives Neghbor VPANC$_{MeasReport\_ij}$ from VPANC
VPANCC processor 216 forms DeadZone$_{geoloc\_i}$=f (NeghborVPANC$_{ChQuality\_ij\_}$, VPANC$_{geolocNeigh\_ij}$);
VPANCC processor 216 forms VPANCCP=f (NeghborVPANC$_{MeasReport\_ij}$, VPANCCP$_{default}$), such that, if NeghborVPANC$_{ChQuality\_ij}$<NeighChannel Quality$_{Threshold}$, remove the VPANC_Neigh$_{ID\_ij}$ from NeighborVPANList$_{-i}$; populate the Neghbor VPANC$_{ChQuality\_ij}$ of VPANCCP$_{default}$ using NeghborVPANC$_{MeasReport\_ij}$ received above; and populate the DeadZone$_{geoloc\_i}$ of VPANCCP$_{default}$ using DeadZone$_{geoloc\_i}$ formed above VPANCC processor 215 forms CSP$_{coord}$=f (NeghborVPANC$_{MeasReport\_ij}$, CSP$_{default\_i}$), such that, if NeghborVPANC$_{ChQuality\_ij}$<NeighChannelQuality$_{Threshold}$, remove the entry from CSP$_{default\_i}$.

VPANCC sends newly formed CSP$_{coord}$ & VPANCCP$_{coord}$ to requester (VPANC$_{assoc}$) through VPANCC_VPANC_COORDINATED_CONFIG_RES message VPANCC starts the timer$_{VPANCCstale}$ However, if timer$_{VPANCCstale}$ has not expired, VPANCC sends old CSP and VPANCCP to VPANC$_{assoc}$ through VPANCC_VPANC_COORDINATED_CONFIG_RES message VPANC$_{assoc}$ receives CSP$_{coord}$ & VPANCCP$_{coord}$ from VPANCC For i$^{th}$ entry in AssociatedEUDList, VPANCC sends VPANC_EUD_CHANNEL_MEASURE_REQ message to an EUD Device control processor 402 of EUD obtains NeghborVPANC$_{ChQualEud\_ij}$ using channel scan on CCSP from device PHY engine 302

Device control processor 402 of EUD sends EUD_VPANC_CHANNEL_MEASURE_RES (NeghborVPANC$_{ChQualEud\_ij}$) to VPANC VPANC receives NeghborVPANC$_{ChQualEud\_ij}$ from EUD and forms CCSP$_{cand}$=f (CSP$_{coord}$, NeghborVPANC$_{ChQualEud\_ij}$, EUD$_{geoloc\_ij}$, EUD$_{geoloc\_requester}$) by performing following steps:
  Calculating Distance$_{EudReq\_EudAssoc}$ using EUD$_{geoloc\_ij}$, EUD$_{geoloc\_requester}$; and
  Removing entry from CSP$_{coord}$, when Distance$_{EudReq\_EudAssoc}$<Threshold Distance$_{EudReq\_EudAssoc}$ and NeghborVPANC$_{ChQualEud\_ij}$<ThresholdNeghborVPANC$_{ChQualEud}$ VPANC forms VPANSP$_{cand}$=f(VPANSP$_{default}$, NeghborVPANCChQuality_ij, VPANC$_{geolocNeigh\_ij}$, VPANC$_{loadNeigh\_ij}$, VPANC$_{configTpNeigh\_ij}$, VPANC$_{usedTpNeigh\_ij}$, DeadZone$_{geoloc\_i}$, EUD$_{geoloc\_ij}$, EUD$_{geoloc\_requester}$). VPANC may form VPANSP$_{cand}$ by performing the following steps:
  Calculate Distance$_{EudReq\_EudAssoc}$ using EUD$_{geoloc\_ij}$, EUD$_{geoloc\_requester}$
  Remove entry from CandidateVPANCList of VPANSP$_{default}$, if Distance$_{EudReq\_EudAssoc}$<Threshold Distance$_{EudReq\_EudAssoc}$ end NeghborVPANC$_{ChQualEud\_ij}$<ThresholdNeghborVPANC$_{ChQualEud}$
  For each entry in CandidateVPANCList, populate the following:
    VPANC_cand$_{geoloc}$ from VPANC$_{geolocNeigh\_ij}$
    VPANC_cand$_{DeadZone}$ from DeadZone$_{geoloc\_i}$
    VPANC_cand$_{load}$ from VPANC$_{loadNeigh\_ij}$
    VPANC_cand$_{configTp}$ from VPANC$_{configTpNeigh\_ij}$
    VPANC_cand$_{usedTp}$ from VPANC$_{usedTpNeigh\_ij}$ VPANC$_{assoc}$ sends newly formed CCSP$_{cand}$ & VPANSP$_{cand}$ to requester (EUD) using VPANC_EUD_CONFIG_RES VPANC$_{assoc}$ starts timer EUD receives CCSP$_{cand}$ and VPANSP$_{cand}$ from VPANC$_{assoc}$ EUD stores received configuration as: CSP$_{EUD}$=CCSP$_{cand}$ and VPANSP$_{EUD}$=VPANSP$_{cand}$ Step 4: EUD starts the timer$_{periodicChannelAssess}$ and monitors active channel quality on expiry of the timer$_{periodicChannelAssess}$.

Step 5: Once associated with VPANC$_{assoc}$, EUD maintains the connection with the LiFi network by performing following:
  Periodically detect timer$_{periodicChannelAssess}$ expiry
  Assess active channels, when timer$_{periodicChannelAssess}$ has expired by performing the following:
    Device control processor 402 in EUD obtains CurrentChannelQuality from device PHY engine 302
    When CurrentChannelQuality>ChannelQuality$_{ThCurrVpanc}$, EUD starts timer timer$_{periodicChannelAssess}$ and wait for its expiry
    When CurrentChannelQuality<=ChannelQuality$_{ThCurrVpanc}$, EUD initiates a connection switch, which is explained in step 6.

Step 6: EUD performs a channel switch:
  When EUD finds a suitable channel in the VPANC$_{assoc}$, EUD selects that suitable channel to switch and control goes to step 5
  When EUD fails to find a suitable channel in the VPANC$_{assoc}$, control goes to step 2 describe above.

Figure 7:
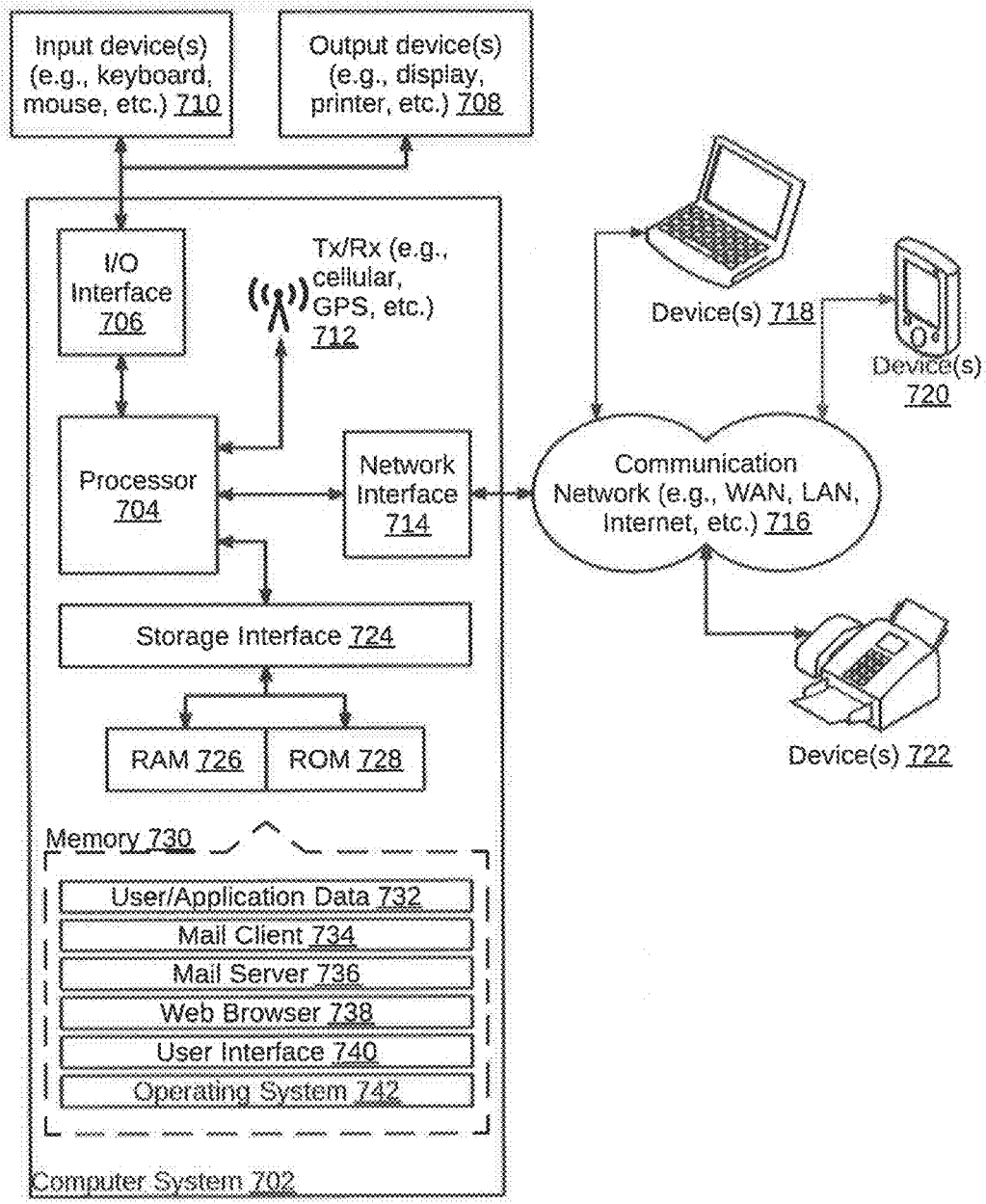
FIG. 7 illustrates a block diagram of an exemplary computer system for implementing various embodiment.

Referring now to FIG. 7, a block diagram of an exemplary computer system for implementing various embodiment is illustrated. Computer system 702 may comprise a central processing unit ("CPU" or "processor") 704. Processor 704 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM'S application, embedded or secure processors, IBM PowerPC, Intel's Core, Itanium, Xeon, Celeron or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE 1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed in connection with processor 704. Transceiver 712 may facilitate various types of wireless transmission or reception. For example, transceiver 712 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (OPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon kindle, Nook, etc.), laptop computers, notebooks, gaming consoles (Microsoft Xbox, Nintendo DS, Sony PlayStation, etc.), or the like. In some embodiments, computer system 702 may itself embody one or more of these devices.

In some embodiments, processor 704 may be disposed in communication with one or more memory devices (e.g., RAM 726, ROM 728, etc.) via a storage interface 724. Storage interface 724 may connect to memory devices 730 including, without limitation, memory drives, removable disc drives, etc., employing connection protocols such as serial advanced technology attachment (SATA), integrated drive electronics (IDE) IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory devices 730 may store a collection of program or database components, including, without limitation, an operating system 732, a user interface application 734, a web browser 736, a mail server 738, a mail client 740, a user/application data 742 (e.g., any data variables or data records discussed in this disclosure), etc. Operating system 732 may facilitate resource management and operation of the computer system 702. Examples of operating system 732 include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 702 may implement web browser 736 stored program component. Web browser 736 may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, computer system 702 may implement mail server 738 stored program component. Mail server 738 may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement mail client 740 stored program component. Mail client 740 may be a mail viewing application, such as Apple Mail, Microsoft Entourage, Microsoft Outlook, Mozilla Thunderbird, etc.

In some embodiments, computer system 702 may store user/application data 742, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text the (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide an EUD and associated method for selecting VPANCs. The EUD and the associated method resolves a number of drawbacks in existing solutions. These drawbacks include, but are not limited to delay in channel scan, unnecessary power consumption by an EUD due to wrong channel scan, unsuitable selection of VPANC, incomplete channel scan for the EUD in case of shorter channel scan duration, increased power consumption in the EUD in case of longer channel scan duration, selection of an unsuitable VPAN having poor quality channel that will affect throughput for an end user, limited mobility within the VPAN, and drop in connection due to dead zones between two VPANs.

The specification has described systems and methods for an EUD and associated method for selecting VPANCs. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for selecting Visible light communication Personal Area Network Coordinators (VPANCs), the method comprising:
   receiving, by an End User Device (EUD), a set of customized channel scan parameters and a VPANC selection policy from a current VPANC the EUD is associated with, wherein the set of customized channel scan parameters and the VPANC selection policy are created by the current VPANC,
      wherein the set of customized channel scan parameters and the VPANC selection policy are created by the current VPANC based on one or more channel scan parameters and VPANC controlling parameters associated with neighboring VPANCs of the current VPANC and EUD information received from a plurality of EUDs associated with the current VPANC, and
      wherein the one or more channel scan parameters comprises a range of frequencies, a channel scan duration, and a time interval between channel scans, and wherein the VPANC control parameters comprises number of the neighboring VPANCs of the current VPANC, list of the neighboring VPANCs, geo-location of dead zones near the current VPANC, and VPANC measurement reports associated with each neighboring VPANC;
   assessing, by the EUD, quality of an active channel currently used by the EUD, wherein the active channel is associated with the current VPANC; and
   switching, by the EUD, to a new VPANC from a plurality of VPANCs based on the set of customized channel scan parameters and the VPANC selection policy in response to the assessing, wherein the plurality of VPANCs comprise the current VPANC.

2. The method of claim 1, wherein assessing comprises comparing quality of the active channel currently used by the EUD with a predefined channel quality threshold after expiry of a periodic channel assessing timer.

3. The method of claim 2, wherein the EUD switches to the new VPANC, when the quality of the active channel currently used by the EUD is below the predefined channel quality threshold.

4. The method of claim 1 further comprising scanning for a new active channel associated with the current VPANC based on the set of customized channel scan parameters, quality of the new active channel being greater than a predefined channel quality threshold.

5. The method of claim 4 further comprising switching, by the EUD, to the new active channel associated with the current VPANC in response to the scanning.

6. The method of claim 4, wherein the switching to the new VPANC is performed when the new active channel associated with the current VPANC is absent.

7. The method of claim 1 further comprising searching for the new VPANC from the plurality of VPANCs based on the set of customized channel scan parameters and the VPANC selection policy.

8. The method of claim 1 further comprising sending EUD information to the new VPANC, wherein the EUD information associated with the EUD comprises geo-location of the EUD and channel quality measurement reports for the neighboring VPANCs of the EUD.

9. The method of claim 1 further comprising storing, in a memory of the EUD, device control data comprising a set of default channel scan parameters, a default VPANC selection policy, a predefined channel quality threshold of an associated VPANC, associated VPANC Identifier (ID), a periodic channel assessing timer, the set of customized channel scan parameters, the VPANC selection policy, list of available VPANCs obtained after channel scan performed by EUD, IDs of the available VPANCs, channel quality associated with the available VPANCs, a list of VPANCs provided in the VPANC selection policy, a list of newly detected VPANCs not present in the list of VPANCs provided in the VPANC selection policy, effective distance between the EUD and each VPANC in the list of available VPANCs, effective distance between the EUD and dead zones neighboring a VPANC the EUD is currently associated with, effective rank of each VPANC in the list of available VPANCs, geo-location of the EUD, and quality of the active channel currently used by the EUD, wherein the list of available VPANCs comprise the list of VPANCs provided in the VPANC selection policy and the list of newly detected VPANCs.

10. An End User Device (EUD) in a Light Fidelity (Li-Fi) network, the EUD comprising:
    a network interface communicatively coupled to a current Visible light communication Personal Area Network Coordinator (VPANC);
    a processor; and
    a memory communicatively coupled to the processor, wherein the memory stores processor instructions, which, on execution, causes the processor to:
        receive a set of customized channel scan parameters and a VPANC selection policy from the current VPANC the EUD is associated with, wherein the set of customized channel scan parameters and the VPANC selection policy are created by the current VPANC,
            wherein the set of customized channel scan parameters and the VPANC selection policy are created by the current VPANC based on one or more channel scan parameters and VPANC controlling parameters associated with neighboring VPANCs of the current VPANC and EUD information received from a plurality of EUDs associated with the current VPANC, and
            wherein the one or more channel scan parameters comprises a range of frequencies, a channel scan duration, and a time interval between channel scans, and wherein the VPANC control parameters comprises number of the neighboring VPANCs of the current VPANC, list of the neighboring VPANCs, geo-location of dead zones near the current VPANC, and VPANC measurement reports associated with each neighboring VPANC;
        assess quality of an active channel currently used by the EUD, wherein the active channel is associated with the current VPANC; and
        switch to a new VPANC from a plurality of VPANCs based on the set of customized channel scan parameters and the VPANC selection policy in response to the assessing, wherein the plurality of VPANCs comprise the current VPANC.

11. The EUD of claim 10, wherein the processor is further configured to compare quality of the active channel currently used by the EUD with a predefined channel quality threshold after expiry of a periodic channel assessing timer.

12. The EUD of claim 11, wherein the EUD switches to the new VPANC, when the quality of the active channel currently used by the EUD is below the predefined channel quality threshold.

13. The EUD of claim 10, wherein the processor is further configured to scan for a new active channel associated with the current VPANC based on the set of customized channel scan parameters, quality of the new active channel being greater than a predefined channel quality threshold.

14. The EUD of claim 13, wherein the processor is further configured to switch the EUD, to the new active channel associated with the current VPANC in response to the scanning.

15. The EUD of claim 13, wherein switching to the new VPANC is performed when the new active channel associated with the current VPANC is absent.

16. The EUD of claim 10, wherein the processor is further configured to search for the new VPANC from the plurality of VPANCs based on the set of customized channel scan parameters and the VPANC selection policy.

17. The EUD of claim 10, wherein the processor is further configured to send EUD information to the new VPANC, wherein the EUD information associated with the EUD comprises geo-location of the EUD and channel quality measurement reports for neighboring VPANCs of the EUD.

18. The EUD of claim 10, wherein the processor is further configured to store, in a memory of the EUD, device control data comprising a set of default channel scan parameters, a default VPANC selection policy, channel quality threshold of an associated VPANC, associated VPANC Identifier (ID), a periodic channel assessing timer, the set of customized channel scan parameters, the VPANC selection policy, list of available VPANCs obtained after channel scan performed by EUD, IDs of the available VPANCs, channel quality associated with the available VPANCs, a list of VPANCs provided in the VPANC selection policy, a list of newly detected VPANCs not present in the list of VPANCs provided in the VPANC selection policy, effective distance between the EUD and each VPANC in the list of available VPANCs, effective distance between the EUD and dead zones neighboring a VPANC the EUD is currently associated with, effective rank of each VPANC in the list of available VPANCs, geo-location of the EUD, and quality of the active channel currently used by the EUD, wherein the list of available VPANCs comprise the list of VPANCs provided in the VPANC selection policy and the list of newly detected VPANCs.

19. A non-transitory computer-readable storage medium having stored thereon, a set of computer-executable instructions for selecting Visible light communication Personal Area Network Coordinators (VPANCs), causing a computer comprising one or more processors to perform steps comprising:
    receiving a set of customized channel scan parameters and a VPANC selection policy from a current VPANC an EUD is associated with, wherein the set of customized channel scan parameters and the VPANC selection policy are created by the current VPANC,
        wherein the set of customized channel scan parameters and the VPANC selection policy are created by the current VPANC based on one or more channel scan parameters and VPANC controlling parameters associated with neighboring VPANCs of the current VPANC and EUD information received from a plurality of EUDs associated with the current VPANC, and
        wherein the one or more channel scan parameters comprises a range of frequencies, a channel scan duration, and a time interval between channel scans, and wherein the VPANC control parameters comprises number of the neighboring VPANCs of the current VPANC, list of the neighboring VPANCs, geo-location of dead zones near the current VPANC, and VPANC measurement reports associated with each neighboring VPANC;
    assessing quality of an active channel currently used by the EUD, wherein the active channel is associated with the current VPANC; and
    switching the EUD to a new VPANC from a plurality of VPANCs based on the set of customized channel scan parameters and the VPANC selection policy in response to the assessing, wherein the plurality of VPANCs comprise the current VPANC.

* * * * *